Patented Aug. 27, 1946

2,406,713

UNITED STATES PATENT OFFICE 2,406,713

PROCESS FOR RECOVERY OF DIHYDRIC ALCOHOLS

Murray Senkus, Terre Haute, Ind., assignor to Commercial Solvents Corporation, Terre Haute, Ind., a corporation of Maryland No Drawing. Application February 28, 1944, Serial No. 524,284

7 Claims. (Cl. 260—633)

My invention relates to an improved process for recovering dihydric alcohols from mixtures thereof. More particularly, it is concerned with a novel method of recovering dihydric alcohols from their crude aqueous mixtures.

In numerous industrial operations, it is necessary to recover dihydric alcohols from their dilute aqueous mixtures or solutions. For example, in the production of 2,3-butanediol by the fermentation of cereal grain mashes with the class of bacteria known as *Aerobacter aerogenes* or similar organisms, the desired product is present in the spent mash usually to the extent of from about 3 to 6 per cent. Recovery of the glycol from such aqueous mixtures presents a difficult problem. Because of the relatively large volume of water present in proportion to the quantity of glycol, it is economically unsound to attempt recovery thereof by distillation even with a distillation system capable of making a satisfactory separation. Extraction of the glycol from such media has been attempted; however, this method is time-consuming and inefficient due at least partially to emulsions which frequently form during the extraction operation.

The recovery of dihydric alcohols produced by the action of alkaline permanganate on olefins in aqueous media is also difficult to effect by ordinary means since the crude product is present in the reaction mixture in such low concentrations.

I have now discovered a method whereby dihydric alcohols having hydroxyl groups either on adjacent or alternate carbon atoms may be readily and substantially completely recovered from crude or dilute aqueous mixtures thereof by reacting the dihydric alcohol contained therein with formaldehyde in the presence of a suitable acid catalyst to produce the corresponding formal as shown by the equation:

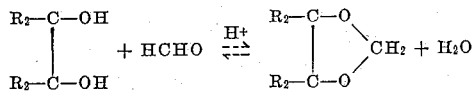

Reactions of the above type are most advantageously effected in the absence of water. Therefore, it would ordinarily be expected that the presence of the substantial concentrations of water encountered in the process of my invention would tend to drive the above equilibrium to the left. Notwithstanding this prediction, which is technically well-founded, I am able to effect substantially complete removal of the dihydric alcohol from mixtures containing a large excess of water.

In accordance with the process of my invention, the mixture from which the dihydric alcohol is to be recovered is first freed of materials which tend to inhibit or interfere with the reaction of formaldehyde and the dihydric alcohol. Thereafter from about 1 to 5 per cent of a suitable acid catalyst, such as p-toluene-sulfonic acid, sulfuric acid, hydrochloric acid, etc., and a molecular excess of formaldehyde in any convenient form, such as trioxymethylene or a 35 to 40 per cent solution of formaldehyde, are added. The resulting mixture is distilled, the formal thus produced being carried over with water as a constant boiling mixture. The distillate obtained may consist of two layers or it may be a homogeneous liquid mixture. If the former is the case, the oil layer is separated by any convenient means and the water layer is preferably conducted to the still kettle until no additional formal distills over. In instances where the distillate consists of an aqueous homogeneous mixture of formal, the latter is caused to separate in the form of an oil by the addition of a suitable salt thereto, such as for example, sodium carbonate. The oil layer of the distillate is separated from the water portion thereof and thereafter subjected to a hydrolysis treatment in order to obtain the free dihydric alcohol. This step is accomplished by distilling at a relatively high reflux ratio a mixture consisting of the formal, water, methanol, and a strong acid, such as sulfuric or hydrochloric acid. The general reaction involved may be illustrated by the following equation:

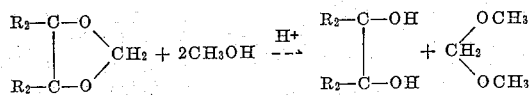

When it appears that substantially all of the excess formaldehyde, methyl formal, water, and alcohol have been removed as evidenced by an increase in temperature to a value of between about 100 and 105° C., sufficient alkali is added to neutralize the acid present in the residue. The free dihydric alcohol is then obtained by distillation of the neutralized mixture at atmospheric or reduced pressures if considered necessary or desirable. The methyl formal thus produced may be converted to formaldehyde and methanol, both of which can be reused, by introducing the methyl formal into an aqueous solution of sulfuric acid (10 to 15 percent) at a temperature of about 90 to 95° C. and condensing the resultant methanol-formaldehyde vapors in a suitable receiver.

In addition to 2,3-butanediol, other dihydric alcohols, such as ethylene glycol, 1,2-propanediol, 2-methyl-2,4-pentanediol, 1,3-propanediol, 1,2-butanediol, 3-chloro-1,2-propanediol, and the like may be recovered from their dilute aqueous mixtures in accordance with the process of my invention.

The process of my invention may be more specifically illustrated by the following examples.

*Example I*

Three hundred and sixty gallons of beer (spent mash) resulting from the action of the organism Aerobacter aerogenes on a cereal grain mash, containing 72 pounds of 2,3-butanediol was charged to a 500 gallon still kettle connected to a 30 plate distillation column. The mixture was distilled at a 4:1 reflux ratio until the vapor temperature had reached 99–100° C. This distillation yielded 24 gallons of distillate which contained 20 per cent by volume of ethyl alcohol. The residue was cooled to 95° C. and 200 pounds of 50 per cent aqueous sulfuric acid and 300 pounds of 36 per cent aqueous formaldehyde were introduced into the kettle. The mixture was distilled at total take-off into a decanter. The upper oil layer which separated was collected and the lower aqueous layer was returned to the kettle. The separation of oil in the decanter ceased after ten hours distillation. The quantity of formal recovered amounted to 97 pounds corresponding to a recovery of 2,3-butanediol as glycol formal in a yield of 100 per cent of theory. The formal thus obtained was then added to a mixture consisting of 3.9 pounds of concentrated hydrochloric acid, 33 pounds of water, and 156 pounds of methanol. This fixture was then distilled through an efficient fractionating column at a reflux ratio of 10:1. When the vapor temperature had reached 105° C., two pounds of sodium carbonate was added. Distillation of the residue at atmospheric pressure resulted in the procurement of 2,3-butanediol boiling at 178–180° C. in a conversion of 94 per cent of theory.

Example II

A mixture consisting of 38 parts of 1,3-propanediol, 20 parts of trioxymethylene, 400 parts of water, and 3 parts of sulfuric acid was distilled through an efficient fractionating column at a 3:1 reflux ratio. 1,3-dioxane distilled as a constant boiling mixture with water at 86.5° C. Toward the end of the reaction, the vapor temperature rose to 99° C. The distillate thus obtained was a homogeneous aqueous mixture. To the latter was added 100 parts of anhydrous potassium carbonate and after substantially all of the salt had dissolved, two liquid layers were observed to form, the upper layer containing principally 1,3-dioxane and the lower layer being an aqueous potassium carbonate solution. The top layer was separated and dried over night over 10 parts of powdered sodium hydroxide. The dried liquid was then distilled and 1,3-dioxane boiling at 104–105° C. was obtained in a conversion of 95 per cent of theory. 1,3-propanediol was then obtained by hydrolysis of the 1,3-dioxane in accordance with the procedure described in Example I.

Example III

A mixture consisting of 28 parts of 3-chloro-1,2-propanediol, 400 parts of water, 12 parts of trioxymethylene, and 4.5 parts of sulfuric acid was distilled at a reflux ratio of 4:1. The product distilled as a constant boiling mixture with water at 99° C. and separated as a lower layer in the receiver. The product layer was removed and dried over 3.5 parts of powdered anhydrous potassium carbonate. This dried material was next rectified through a suitable distillation column at a 5:1 reflux ratio. The 4-chloromethyl-1,3-dioxolane produced in the above manner was obtained in a conversion of 70 per cent of theory.

*Analysis.*—Calculated for $C_4H_8O_2Cl$: Cl, 28.93; C, 39.20. Found: Cl, 28.97; C, 39.67. B. P., 66–68° C. (40 mm.); $d_{20}^{20}$, 1.2562; $n_D^{20}$, 1.4500.

3-chloro-1,2-propanediol was recovered by the acid hydrolysis of 4-chloromethyl-1,3-dioxolane in accordance with the procedure described in Example I.

It is to be specifically understood that the examples given above are in no way to be considered limitative since it will be obvious to those familiar with the art to which my invention is directed that my process is equally applicable to the recovery of other similar dihydric alcohols from crude aqueous mixtures thereof. In general, it may be stated that the use of any equivalent or any modification of procedure which would normally occur to one skilled in the art is included in the scope of my invention.

My invention now having been described, what I claim is:

1. In a process for the recovery of dihydric alcohols from crude aqueous mixtures thereof, said alcohols being selected from the group consisting of alcohols having hydroxyl groups on adjacent carbon atoms and those having hydroxyl groups on alternate carbon atoms, the improvement comprising adding to said mixture formaldehyde and an acid acetalization catalyst, distilling the resultant mixture at temperatures below 100° C., recovering the formal thus produced and hydrolyzing the latter to obtain the free dihydric alcohol.

2. In a process for the recovery of dihydric alcohols from crude aqueous mixtures containing dissolved and suspended solids, said alcohols being selected from the group consisting of alcohols having hydroxyl groups on adjacent carbon atoms and those having hydroxyl groups on alternate carbon atoms, the improvement comprising adding to said mixture formaldehyde and an acid acetalization catalyst, distilling the resultant mixture at temperatures below 100° C., recovering the formal thus produced and hydrolyzing the latter to obtain the free dihydric alcohol.

3. In a process for the recovery of 2,3-butylene glycol from a spent mash in which said glycol has been produced by fermentation, the improvements comprising removing substances that interfere with the reaction of formaldehyde with said glycol, thereafter adding formaldehyde and an acid acetalization catalyst to the spent mash containing 2,3-butanediol, distilling the resultant mixture at temperatures below 100° C., recovering the 4,5-dimethyl-1,3-dioxolane thus produced and subjecting the latter to acid hydrolysis to obtain the free 2,3-butanediol.

4. The process of claim 3 in which the 2,3-butanediol present in the fermentation residue has been produced by the action of bacteria of the class *Aerobacter aerogenes* on a nutrient mash.

5. In a process for the recovery of dihydric alcohols from dilute aqueous mixtures thereof, said alcohols being selected from the group consisting of alcohols having hydroxyl groups on adjacent carbon atoms and those having hydroxyl groups on alternate carbon atoms, the improvement comprising adding to said mixture formaldehyde and an acid acetalization catalyst, distilling the resultant mixture at temperatures below 100° C., recovering the formal thus produced and hydrolyzing the latter to obtain the free dihydric alcohol.

6. The process of claim 5 in which the dihydric alcohol is 1,3-propanediol.

7. The process of claim 5 in which the dihydric alcohol is 3-chloro-1,2-propanediol.

MURRAY SENKUS.